(12) United States Patent
Skoug

(10) Patent No.: US 6,626,479 B1
(45) Date of Patent: Sep. 30, 2003

(54) DEVICE FOR POSITIONING CONTAINER IN CARGO SPACE OF VEHICLE

(76) Inventor: Steve Skoug, 1642 8½ Ave., Chetek, WI (US) 54728

( * ) Notice: Subject to any disclaimer, the term of this patent is extended or adjusted under 35 U.S.C. 154(b) by 0 days.

(21) Appl. No.: 10/238,788

(22) Filed: Sep. 11, 2002

(51) Int. Cl.[7] .............................................. B60N 3/12
(52) U.S. Cl. ...................... 296/37.6; 224/404; 414/812
(58) Field of Search ............................... 296/37.6, 181, 296/156, 37.1, 39.2; 224/403, 68.3, 543, 404, 505, 281; 414/498, 398, 812; 294/68.3, 67.1; 108/147; 187/210; 410/24; 184/6.3

(56) References Cited

U.S. PATENT DOCUMENTS

| | | | |
|---|---|---|---|
| 1,920,825 A | | 8/1933 | Williams |
| 2,831,746 A | | 4/1958 | Hartnett |
| 3,361,510 A | | 1/1968 | McDermott |
| 3,938,766 A | | 2/1976 | Herbolsheimer et al. |
| 4,564,167 A | * | 1/1986 | Smith ......................... 224/404 |
| 4,728,017 A | * | 3/1988 | Mullican .................... 296/37.6 |
| 4,957,228 A | * | 9/1990 | Balka ......................... 224/505 |
| 4,967,944 A | * | 11/1990 | Waters ....................... 296/37.6 |
| 4,984,962 A | * | 1/1991 | Jarvinen ..................... 414/812 |
| 5,121,959 A | * | 6/1992 | King .......................... 296/37.6 |
| 5,398,987 A | * | 3/1995 | Sturgis ....................... 296/37.6 |
| 5,494,315 A | * | 2/1996 | Heltenburg ................. 296/37.6 |
| 5,582,451 A | * | 12/1996 | Baumann .................... 294/68.3 |
| 5,615,922 A | * | 4/1997 | Blanchard .................. 296/37.6 |
| 5,664,821 A | * | 9/1997 | Crowson .................... 294/67.1 |
| 5,804,932 A | | 9/1998 | Yanagisawa |
| 5,809,908 A | * | 9/1998 | Catta et al. .................. 108/147 |
| 5,899,544 A | * | 5/1999 | James et al. ................ 296/37.6 |
| 5,924,615 A | | 7/1999 | McGarrah |
| 5,937,972 A | * | 8/1999 | Andre ......................... 187/210 |
| 6,010,046 A | * | 1/2000 | Neeser ........................ 224/281 |
| 6,027,290 A | * | 2/2000 | Andre .......................... 410/24 |
| 6,068,319 A | | 5/2000 | O'Brien |
| 6,155,770 A | * | 12/2000 | Warhurst ..................... 414/498 |
| 6,253,877 B1 | * | 7/2001 | Yang ............................ 184/6.3 |
| 6,257,640 B1 | * | 7/2001 | Leitner et al. .............. 296/37.6 |
| 6,264,083 B1 | * | 7/2001 | Pavlick et al. .............. 296/37.6 |
| 6,375,054 B1 | * | 4/2002 | Lance et al. ................ 296/37.6 |
| 6,409,064 B1 | * | 6/2002 | Bayley ....................... 296/37.6 |
| 6,460,744 B2 | * | 10/2002 | Lance et al. ................ 296/37.6 |
| 6,467,830 B1 | * | 10/2002 | Cortright .................... 296/37.6 |
| 6,471,278 B2 | * | 10/2002 | Leitner et al. .............. 296/37.6 |

FOREIGN PATENT DOCUMENTS

FR               2560019          8/1985

* cited by examiner

*Primary Examiner*—Kiran Patel
(74) *Attorney, Agent, or Firm*—Richard C. Littman

(57) ABSTRACT

The present invention is a device for positioning a container in a cargo space of a vehicle. The device has a threaded rod attached to a bottom surface of the cargo space, a gear which is in rotating engagement with the threaded rod, a bearing, a flange, and a nut. The nut is attached to the threaded rod, and the container is attached to the flange with a connector. The container further has a tube with an inner surface, where the tube receives the threaded rod, and the nut is in sliding engagement with the inner surface of the tube. When the gear is rotated in a first direction, the container is raised inside the cargo space of the vehicle. When the gear is rotated in a second direction, the container is lowered.

20 Claims, 4 Drawing Sheets

DEVICE FOR POSITIONING CONTAINER IN CARGO SPACE OF VEHICLE

BACKGROUND OF THE INVENTION

1. Field of the Invention

The present invention relates a device for positioning a container in a cargo space of a vehicle, in particular a device for vertically positioning a tool box in a truck bed of a truck.

2. Description of the Related Art

A container, such as a tool box, is a common accessory for a vehicle, particularly trucks with open truck beds. Conventional tool boxes are provided inside the truck bed and/or rest on the top surfaces of the side of the truck bed. Access is typically from the top side of the tool box. Since many conventional tool boxes are mounted on top surfaces of the sides of the truck bed, the rear view of the driver is obstructed by the tool box. Some conventional tool boxes rest on the bottom surface of the truck bed which reduces the cargo capacity of the truck.

Especially with newer trucks, the sides of the truck bed are high and the inside and outside walls of the truck bed are several inches apart. Thus, it is difficult if not impossible to access the top side of a conventional tool box from the side of the truck. In order to access the tool box, a user has to get in the back of the truck or lean against the side of the truck. When removing heavy items from the conventional tool box, there is a great risk of injury to the user, particularly back injury. Also, a user may easily damage the paint job of the truck by leaning against the truck. A user may get their clothes dirty by leaning against a dirty truck. Climbing into the back of the truck can be dangerous, especially when there is snow or rain and the back of the truck is slippery. A conventional tool box leaves very little clearance between the bottom of the box and the bed of the truck, cutting off valuable cargo space and making it difficult to haul long loads, i.e. lumber, ladders and the like.

Various devices have been proposed for vertically positioning containers within vehicles, but the devices are associated with lightweight applications, such as typewriters and bar tables. None of these devices teach or suggest modifying the devices for use in positioning a container in a cargo space of a vehicle.

U.S. Pat. No. 2,831,746, issued Jul. 15, 1955 to J. P. Hartnett discloses a typewriter platform raised and lowered by the rotation of screws. French Patent No. 2,560,019, issued Aug. 30, 1985 to Pavlicevic discloses a retractable bar table where the table is raised and lowered by means of an endless screw, a transmission belt and a motor. Neither Hartnett nor Pavlicevic teaches or suggests using their respective devices for positioning a container, such as a tool box, in a cargo space, such as a truck bed, of a vehicle, such as a truck. Further, nothing in Hartnett or Pavlicevic teaches or discloses a gear which is in rotating engagement with a fixed screw in order to raise or lower the platform or table.

Other devices have been proposed for positioning tool boxes in trucks; however, vertical adjustment of the container, if proposed, is accomplished with adjustable brackets which must be disconnected and reconnected in order to change the level of the tool box. The proposed devices do not address the many problems of containers discussed above including obstructing the rear view of the driver from the cab of the truck and the difficulty encountered by a user when attempting to access the top side of a tool box.

U.S. Pat. No. 6,068,319, issued May 30, 2000 to O'Brien discloses a shelving and storage system for a cargo box of a pickup truck. U.S. Pat. No. 6,264,083, issued Jul. 24, 2001 to Pavlick et al. discloses an add-on tool box transport for use with a truck bed. Both the O'Brien and Pavlick devices do not permit quick and easy vertical positioning of the container, do not permit access to the container from the side of the truck, and obstruct the view of the driver from the cab of the truck.

Other devices for vertical positioning include U.S. Pat. No. 1,920,825, issued Aug. 1, 1933 to L. K. Williams (page storage cabinet); U.S. Pat. No. 3,361,510, issued Jan. 2, 1968 to E. P. McDermott (filing cabinet elevator); U.S. Pat. No. 3,938,766, issued Feb. 17, 1976 to Herbolsheimer et al. (adjustable typewriter platform mechanism); U.S. Pat. No. 5,804,932, issued Sep. 8, 1998 to Yanagisawa (drive system); U.S. Pat. No. 5,809,908, issued Sep. 22, 1998 to Catta et al. (lifting means for work stations); U.S. Pat. No. 5,924,615, issued Jul. 20, 1999 to McGarrah (hanging storage box for truck beds); and U.S. Pat. No. 6,010,046, issued Jan. 4, 2000 to Neeser (storage box assembly for pickup trucks).

None of the above inventions and patents, taken either singularly or in combination, is seen to describe the instant invention as claimed. Thus a device for positioning a container in a cargo space of a vehicle solving the aforementioned problems is desired.

SUMMARY OF THE INVENTION

The present invention is a device for positioning a container in a cargo space of a vehicle. In particular, the present invention is a device for positioning a tool box in a truck bed of a truck. The device provides for the positioning of the container in a normal transport position and in a raised or access position. In the normal transport position, the user can access the container from a top lid. In the raised or access position, the user can access the container from ground level and from both sides of the vehicle. Also, the user can still put long load cargo into the vehicle.

In one exemplary embodiment of the present invention, the device for positioning a container in a cargo space of a vehicle has a threaded rod attached to a bottom surface of the cargo space, a gear which is in rotating engagement with the threaded rod, a bearing, a flange, and a nut. The nut is attached to the threaded rod, and the container is attached to the flange with a connector. The container further has a tube with an inner surface, where the tube receives the threaded rod, and the nut is in sliding engagement with the inner surface of the tube. When the gear is rotated in a first direction, the container is raised inside the cargo space of the vehicle. When the gear is rotated in a second direction, the container is lowered.

Accordingly, it is a principal object of the invention to provide a device for positioning a container in a cargo space of a vehicle.

It is another object of the invention to provide a device for positioning a tool box in a truck bed of a truck.

It is a further object of the invention to provide a device for positioning a container in a cargo space of a vehicle which can be positioned into a normal transport position which allows a user to access the container from the top side of the container.

Still another object of the invention is to provide a device for positioning a container in a cargo space of a vehicle which can be positioned into a raised or access position which allows a user to access to the container from ground level and from both sides of the vehicle.

It is another object of the invention to provide a device for positioning a container in a cargo space of a vehicle which can be positioned into a raised or access position which allows a user to place long load cargo into the cargo space underneath the container.

It is a further object of the invention to provide a device for positioning a container in a cargo space of a vehicle with a threaded rod and a gear in threaded and rotating engagement with the threaded rod.

Still another object of the invention is to provide a device for positioning a container in a cargo space of a vehicle which is powered by the vehicle electrical system.

It is another object of the invention to provide a device for positioning a container in a cargo space of a vehicle which is powered by a self-contained means.

It is a further object of the invention to provide a device for positioning a container in a cargo space of a vehicle which is powered by a rechargeable battery.

Still another object of the invention is to provide a device for positioning a container in a cargo space of a vehicle which includes a rechargeable battery charger.

It is another object of the invention to provide a device for positioning a container in a cargo space of a vehicle which includes a needle bearing.

It is a further object of the invention to provide a device for positioning a container in a cargo space of a vehicle with a guard for preventing inadvertent contact with the device including the hands and fingers of a user, cargo being hauled in the truck, dirt, and water.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
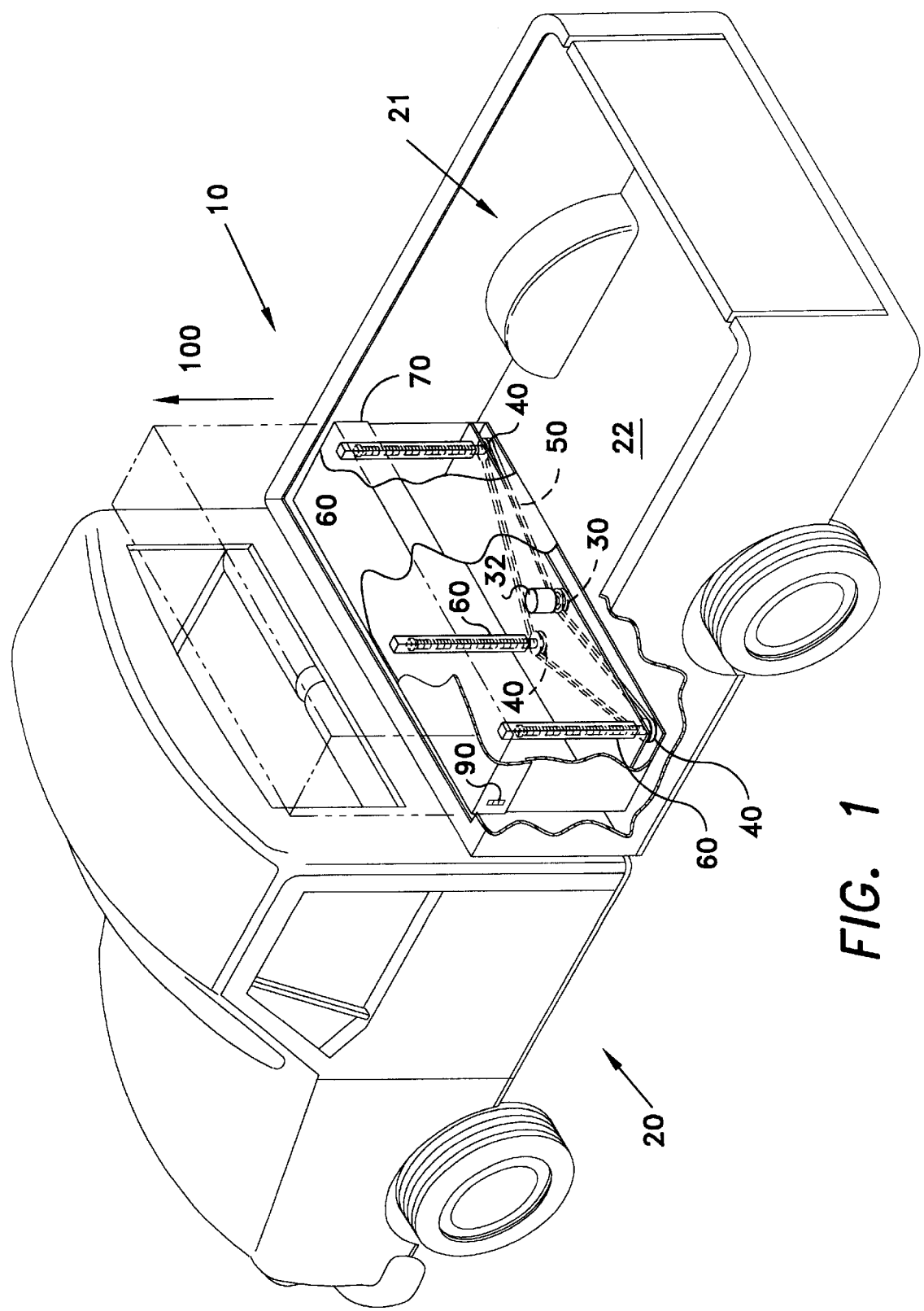
FIG. 1 is an environmental, perspective view of a device for positioning a container in a cargo space of a vehicle in a normal transport position.

The present invention is a device for adjusting the position of a container in a vehicle, designated generally as 10 in the drawings. As seen in FIG. 1, the device 10 is provided for positioning a container 70, such as a tool box, in a cargo space 21, such as a truck bed, of a vehicle 20, such as a truck. FIG. 1 shows one embodiment of the device 10 in a normal transport position in a truck. In this position, the user can still use the device 10 like a normal tool box with a top lid.

Figure 2:
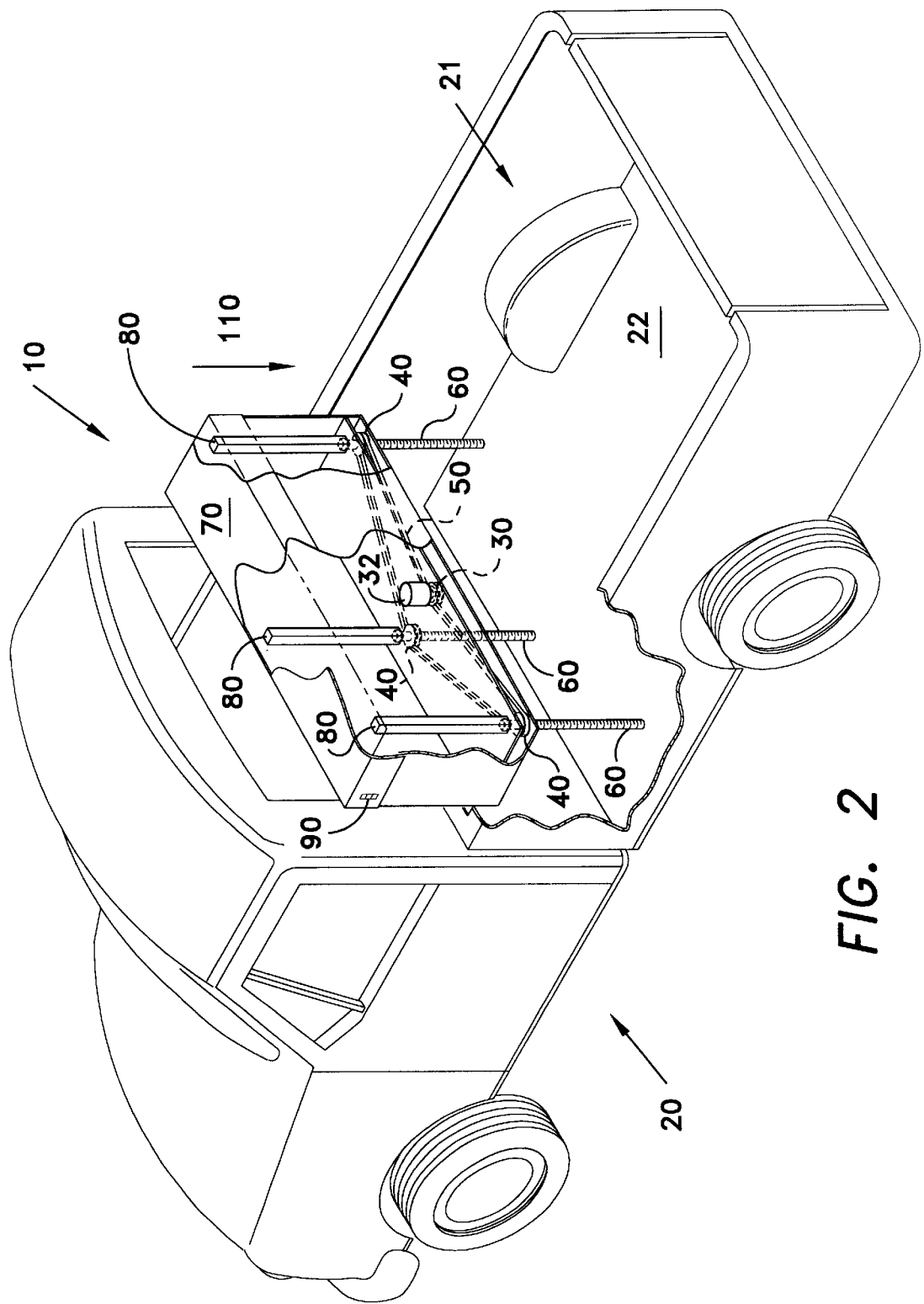
FIG. 2 is an environmental, perspective view of the device in a raised or access position.

FIG. 2 shows one embodiment of the device 10 in a raised or access position in a truck. In this position, the user can now access the tool box from ground level and from both sides of the truck. Also, the user can still put long load cargo into the truck bed, i.e. lumber, ladders and the like.

The device 10 comprises a threaded rod 60 attached to a bottom surface 22 of the cargo space 21 using any suitable method of attachment, preferably a method which provides for the stable support of the loads associated with safely supporting a fully loaded tool box and the device 10 of the present invention, particularly when the device 10 of the present invention is in an extended position (FIG. 2). The threaded rod 60 may be made of any suitable material including steel and stainless steel. Two characteristics of the threaded rod 60, the angle of the threads and the number of threads per linear unit, could be modified for different embodiments of the present invention resulting in different lifting capacities.

The device 10 has a gear 40 which is in threaded and rotating engagement with the threaded rod 60. The gear 40 may be driven by any suitable means including but not limited to an electrical connection to the vehicle 20, or a self-contained means for powering the device 10, an example of which will be discussed in greater detail below.

In one exemplary embodiment of the present invention, the container 70 is a tool box made of metal, such as diamond plate aluminum or painted sheet metal. The container 70 may be of any size. When used for a truck, the container 70 may be about 60" to 62" wide, about 16" or 24" deep, and about 22" high. The container 70 may be accessible from the top or sides. In particular and unlike conventional tool boxes, the container 70 of the present invention is accessible from the side and adjacent to the driver or passenger's side of a vehicle 20, such as a truck.

Figure 3:
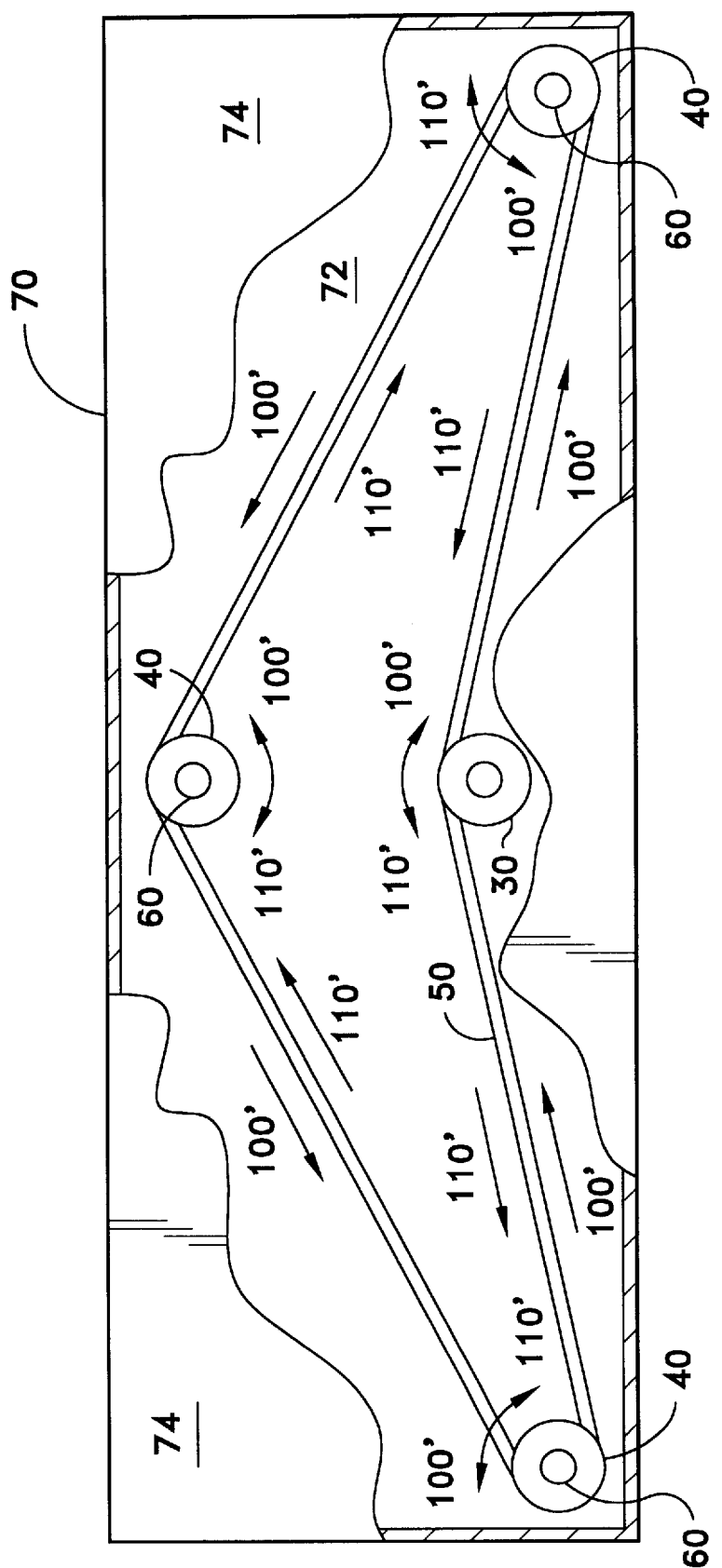
FIG. 3 is a bottom view of the device.

As seen in FIGS. 1–3, the device 10 may be provided such that when the device 10 is operated, the container 70 is moved in a vertically upward direction 100 (FIG. 1) when the gear 40 is rotated in a first direction 100' (FIG. 3) and the container 70 is moved in a vertically downward direction 110 (FIG. 2) when the gear 40 is rotated in a second direction 110' (FIG. 3). Although the first direction 100' of rotation of the gear 40 is shown to be counter-clockwise and the second direction 110' of rotation of the gear 40 is shown to be clockwise, these directions may be reversed, depending on the direction of the threads on the threaded rod 60.

As seen in FIGS. 1–3, the device 10 may be provided with a self-contained means for powering the device 10 such that the gear 40 is driven by a belt or chain 50, and the belt or chain 50 is driven by a drive gear 30 of a motor 32. The belt or chain 50 drives the gear 40 in unison which causes the gear 40 to climb the threaded rod 60 thereby lifting the container 70. The belt or chain 50 may be, for example, a toothed belt, a toothed chain, a roller chain or a cog belt. For high speed applications, a cog belt is desirable. For heavy load applications, a chain is desirable. The motor 32 may desirably be a DC reversible motor. The device 10 may be powered by a rechargeable battery pack which is used with portable, rechargeable power tools. A rechargeable battery charger could be built into the container 70 and simultaneously supply power to the device 10. It has been found that the power provided by such rechargeable batteries is sufficient to supply the motor 32 of the device 10. The device 10 may, optionally, be directly powered by the electrical system of the vehicle 20 or any other suitable method of providing power to the motor 32. Regardless of the method used for providing power, as seen in FIGS. 1 and 2, the device 10 may also comprise a switch 90 such as a rocker switch and the rocker switch may have "up" and "down" modes to correspond with the upward and downward movement of the container 70. The switch 90 can be mounted in any suitable location including on the container 70 and inside the vehicle 20.

Figure 4:
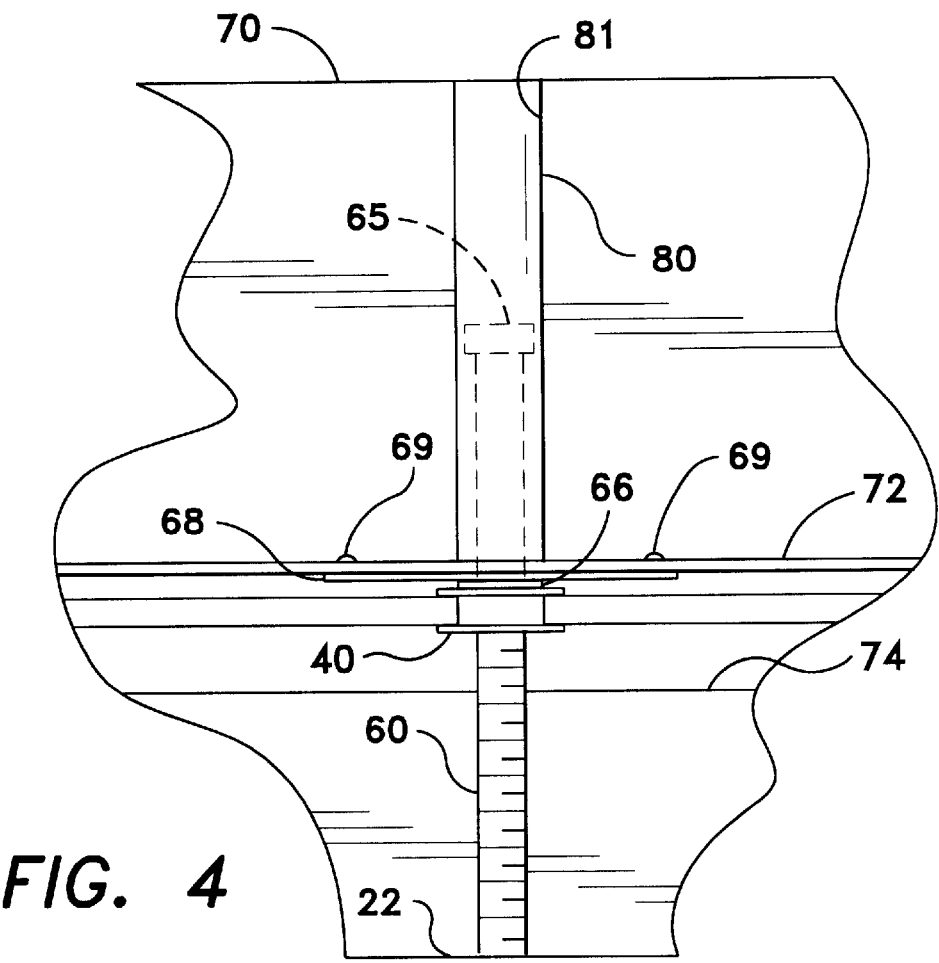
FIG. 4 is a side view of the device.

As seen in FIG. 4, the device 10 further comprises a bearing 66, a flange 68, and a nut 65. The nut 65 is attached to the threaded rod 60. The bearing 66 may be a thrust washer bearing, a needle bearing, or any suitable type of bearing. At one end 72 of the container 70, the container 70 is attached to the flange 68 with a connector 69 such as pop rivets or bolts. The container 70 further comprises a tube 80 each with an inner surface 81. The tube 80 receives the threaded rod 60. The nut 65 is in sliding engagement with the inner surface 81 of the tube 80.

The gear 40, the bearing 66, the flange 68, the belt or chain 50, and the drive gear 30 may be provided inside or outside of the container 70. As seen in FIGS. 3 and 4, the device 10 may comprises a guard 74. The guard 74 is generally formed on the bottom of the container 70 and either partially or completely encloses the gear 40, the bearing 66, the flange 68, the belt or chain 50, the drive gear 30, and a portion of the threaded rod 60 between the end 72 of the container 70 and the guard 74. The guard 74 may also partially or completely enclose the entire length of the threaded rod 60. The guard 74 is provided to prevent inadvertent contact with the device 10 including the hands and fingers of a user, cargo being hauled in the truck 20, dirt, contaminants, water and the like. The guard 74 could be made of any appropriate material including metal or plastic.

As seen in FIG. 4, the device 10 may be provided such that the threaded rod 60 does not rotate. The lifting action of the device 10 is accomplished by the rotation of the gear 40 against the bearing 66, the flange 68, and the container 70. The nut 65 may be provided with a similar cross-sectional shape, though slightly smaller, as compared to the tube 80. Because the nut 65 is fixed to the threaded rod 60, and because of the close engagement of the nut 65 and the tube 80, the threaded rod 60 does not rotate. In other words, the device 10 may be provided such that the nut 65 prevents the threaded rod 60 from rotating in the tube 80.

In order to provide structural rigidity to the container 70, as seen in FIG. 4, an upper end of the tube 80 may be attached to an upper end the container 70 by any suitable means. It has been found that such attachment desirably increases the overall rigidity of the device 10.

Figure 5:
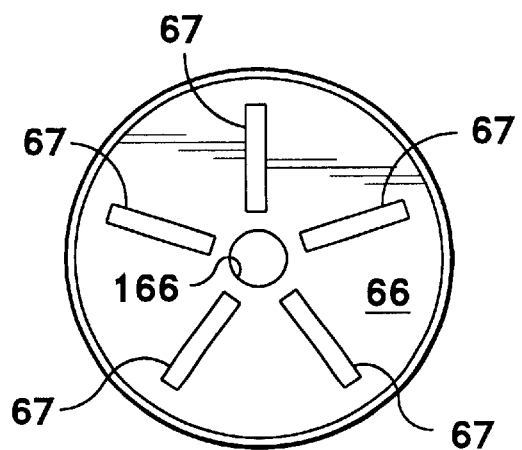
FIG. 5 is a top view of a needle bearing which may be used with the device.

As seen in FIGS. 4 and 5, the device 10 may be provided such that the bearing 66 is a needle bearing disposed between the gear 40 and the flange 68. Needle bearings, typically made of metal such as steel, are particularly advantageous as they can safely support, for example, as much as 2,000 pounds or more per bearing As seen in FIG. 5, the needle bearing 66 has an opening 166 for engagement with the threaded rod 60 and the needle bearing 66 may have a plurality of needle bearing members 67 distributed uniformly and radially about the opening 166. In this case, the needle bearing 66 is shown with five needle bearing members 67 arranged in a star pattern about the opening 166. The needle bearing 66 permits rotational movement of the gear 40 about the threaded rod 60, which, in turn, bears against the flange 68 and provides upward force for raising and lowering the container 70.

Although the FIGS. 1–3 show three sets of threaded rods 60, gears 40, tubes 80 and associated parts of the device 10 in a generally triangular arrangement, it is to be understood that the device 10 could be provided with any number of sets of threaded rods 60, gears 40, tubes 80 and associated parts in any type of arrangement so long as the device 10 suitably performs the purposes and functions described above. While it has been found that three sets is sufficient to effectively perform the purposes and functions of the present invention, using a different number of sets, four for example, may be desirable to further increase the stability and lifting capacity of the device 10.

It is to be understood that the present invention is not limited to the embodiments described above, but encompasses any and all embodiments within the scope of the following claims.

I claim:

1. A device for positioning a container in a cargo space of a vehicle, the device comprising:

a threaded rod attached to a bottom surface of the cargo space;

a gear which is in rotating engagement with the threaded rod;

a bearing;

a flange; and a nut;

wherein the nut is attached to the threaded rod;

wherein the container is attached to the flange with connector;

wherein the container further comprises a tube with an inner surface;

wherein the tube receives the threaded rod;

wherein the nut is in sliding engagement with the inner surface of the tube.

2. The device according to claim 1, wherein the container is moved in a vertically upward direction when the gear is rotated in a first direction and the container is moved in a vertically downward direction when the gear is rotated in a second direction.

3. The device according to claim 1, wherein the container is a tool box, the cargo space is a truck bed, and the vehicle is a truck.

4. The device according to claim 1, wherein the threaded rod does not rotate.

5. The device according to claim 1, wherein the gear is driven by a belt or chain, and the belt or chain is driven by a motor.

6. The device according to claim 1, wherein the bearing is a needle bearing disposed between the gear and the flange.

7. The device according to claim 1, wherein the nut prevents the threaded rod from rotating in the tube.

8. The device according to claim 1, wherein the tool box further comprises a rechargeable battery charger.

9. A device for positioning a tool box in a cargo space of a truck, the device comprising:

a threaded rod attached to a bottom surface of the cargo space;

a gear which is in rotating engagement with the threaded rod;

a bearing;

a flange; and a nut;

wherein the nut is attached to the threaded rod;

wherein the tool box is attached to the flange with a connector;

wherein the tool box further comprises a tube with an inner surface;

wherein the tube receives the threaded rod;

wherein the nut is in sliding engagement with the inner surface of the tube.

10. The device according to claim 9, wherein the tool box is moved in a vertically upward direction when the gear is rotated in a first direction and the tool box is moved in a vertically downward direction when the gear is rotated in a second direction.

11. The device according to claim 9, wherein the threaded rod does not rotate.

12. The device according to claim 9, wherein the gear is driven by a belt or chain, and the belt or chain is driven by a motor.

13. The device according to claim 9, wherein the bearing is a needle bearing disposed between the gear and the flange.

14. The device according to claim 9, wherein the nut prevents the threaded rod from rotating in the tube.

15. A tool box for a cargo space of a truck, the tool box comprising:
- a device for vertically positioning the tool box, the device further comprising:
  - a threaded rod attached to a bottom surface of the cargo space;
  - a gear which is in rotating engagement with the threaded rod;
  - a bearing;
  - a flange; and
  - a nut;

wherein the nut is attached to the threaded rod;

wherein the tool box is attached to the flange with a connector;

wherein the container further comprises a tube with an inner surface;

wherein the tube receives the threaded rod;

wherein the nut is in sliding engagement with the inner surface of the tube.

16. The tool box according to claim 15, wherein the tool box is moved in a vertically upward direction when the gear is rotated in a first direction and the tool box is moved in a vertically downward direction when the gear is rotated in a second direction.

17. The tool box according to claim 15, wherein the threaded rod does not rotate.

18. The tool box according to claim 15, wherein the gear is driven by a belt or chain, and the belt or chain is driven by a motor.

19. The tool box according to claim 15, wherein the bearing is a needle bearing disposed between the gear and the flange.

20. The tool box according to claim 15, wherein the nut prevents the threaded rod from rotating in the tube.

* * * * *